United States Patent Office 3,298,239
Patented Jan. 17, 1967

3,298,239
AGRICULTURAL TRACTORS CONTROLLED
BY HYDRAULIC SYSTEMS
Katsuki Miyoshi, Suita-shi, Japan, assignor to
Tadao Yamaoka, Ashiya-shi, Japan
Filed Nov. 4, 1964, Ser. No. 408,841
Claims priority, application Japan, June 5, 1964,
39/31,687
1 Claim. (Cl. 74—218)

The present invention relates to agricultural tractors in which speed change as well as forward and backward movement of the driving wheels is controlled by hydraulic systems.

As is well known, a most desirable matter for an agricultural tractor is that simple manipulation by the operator can drive the tractor at any desired forward or backward speed and stop it almost instantaneously for reversing the direction of travel.

It is an object of the present invention to provide a hydraulically controlled agricultural tractor for which the operator can arbitrarilly select the running speed so that the tractor may work at a slow speed in a field and run at a high speed on a vehicle passage in the field or work at high speed in a field and run at a safe low speed on a vehicle passage in the field.

A further object of the present invention is to provide a hydraulically controlled agricultural tractor in which manipulation of a single lever can easily effect the forward and backward movement of the tractor so that any particular field including every nook and corner thereof can completely be cultivated and so that the tractor can safely and quickly be guided into even a narrow barn.

According to the present invention, there is provided an agricultural tractor comprising belt-type stepless speed change means provided in the power transmission path from a motor to driving wheels, a hydraulic system operative to change the speed ratio of said stepless speed change means, gear means also provided in the power transmission path from the motor to the driving wheels, a hydraulic system operative to shift the gears in said gear means for effecting normal and reverse rotation of the driving wheels, a controller disposed in each of said hydraulic systems, and actuating means having a single lever for actuating both of said controllers.

There are other objects and particularities of the present invention which will become obvious from the following description with reference to the accompanying drawings, in which.

Figure 1:
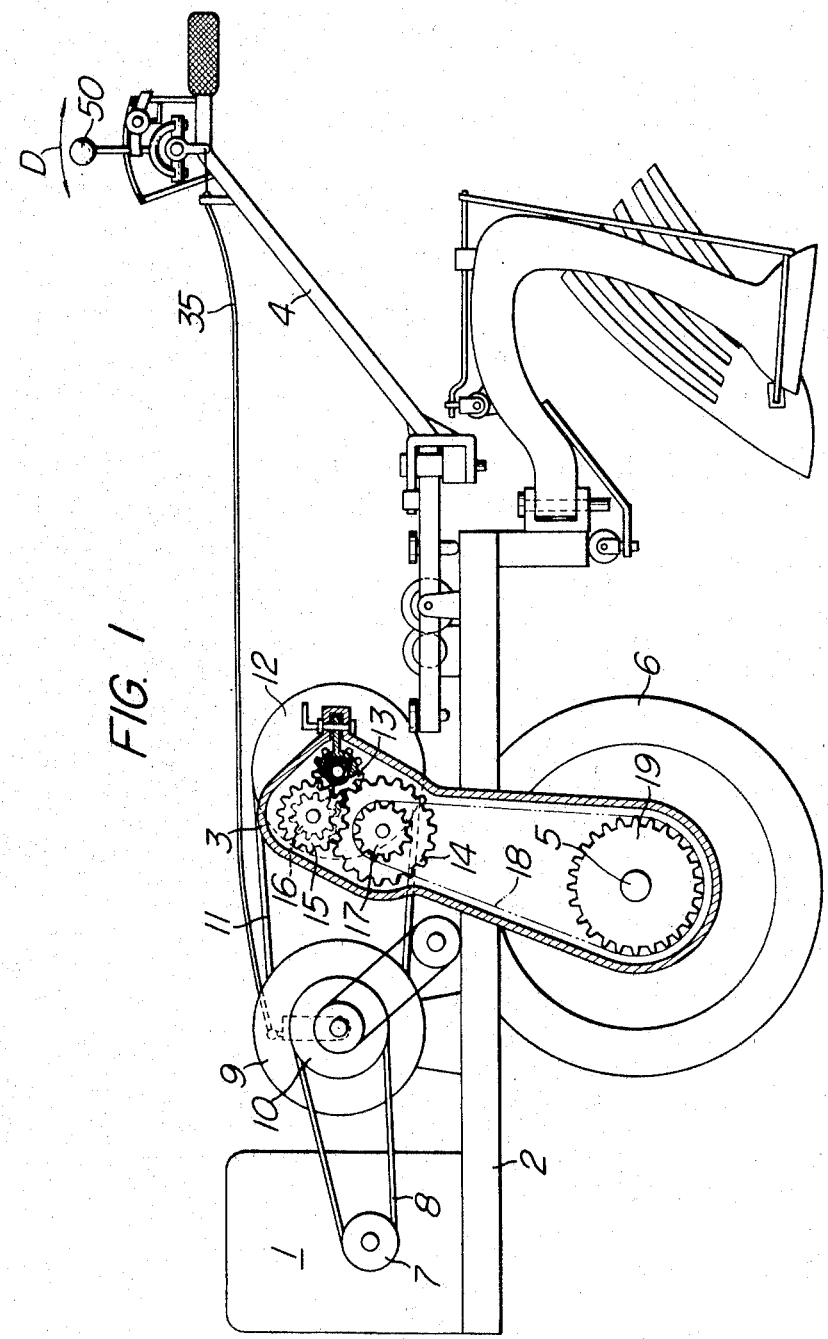
FIG. 1 is a side elevational view of a hydraulically controlled tractor embodying the present invention operating as a cultivator, with parts in vertical section.

Referring first to FIG. 1, a motor 1 is mounted on a frame 2 of the tractor. A gear casing 3 is suitably fixed to the tractor frame 2 and an axle 5 is journalled in a lower part of the gear casing 3. Reference numerals 4 and 6, 6' designate a steering handle and ground engaging wheels, respectively. Driving power is transmitted from a pulley 7 coupled to the motor 1 to a pulley 10 by a V-belt 8. From the pulley 10, the driving power is transmitted to a pulley 9 coaxial with the pulley 10, and to a pulley 12 by a belt 11, thence to a gear 13 coaxial with the pulley 12. In case of forward movement, the power is transmitted from the gear 13 to a bull gear 14 by way of intermediate gears 15 and 16, while in case of backward movement, the power is directly transmitted from the gear 13 to the bull gear 14. From the bull gear 14, the power is transmitted to the axle 5 by way of a sprocket wheel 17, a chain 18 and a sprocket wheel 19 to drive the driving wheels 6 and 6'.

The mechanism of the speed variation will now be described in detail with reference to FIG. 2. The driving power of the motor 1 transmitted to the pulley 7 coupled thereto is in turn transmitted to a shaft 20 on which the pulley 10 is mounted. The pulley 9 is mounted on the shaft 20 in coaxial relation with the pulley 10 and comprises a sheave 9 axially slidable on the shaft 20 and a stationary sheave 9' secured to the shaft 20. The power is then transmitted to the pulley 12 by the V-belt 11 carried between the slidable and stationary sheaves 9 and 9', thence to the gear 13. The pulley 12 is mounted on a shaft 27 in coaxial relation with the gear 13 and comprises a sheave 12 axially slidable on the shaft 27 and a stationary sheave secured to the shaft 27. A pulley 21 is firmly fixed to the pulley 10 for coaxial rotation therewith and drives a pulley 23 through a belt 22 passed therebetween to drive a hydraulic pump 24. Fluid at pressure discharged from the pump 24 is supplied to the input side and the output side of the stepless speed change means by way of conduits 25 and 26, respectively. On the output side of the stepless speed change means, the pressurized fluid is admitted through the conduit 26 and a central axial passage in the shaft 27 into a pressure chamber 30, which is defined by a cylindrical member 28 extending axially outwardly from the outer surface of the slidable sheave 12 and a disc-like member 29 secured on the shaft 27 and engaging with the cylindrical member 28 in fluid-tight relation therewith. Thus, the slidable sheave 12 is normally urged in a direction of arrow 31 by the fluid pressure. On the input side of the stepless speed change means, the pressurized fluid is led through the conduit 25 to a port 33 of a controller 32, but a spool valve member 34 prevents the fluid from communicating with the interior of the controller 32.

When now a Bowden cable 35 is operated to rotate a lever 36 in a direction of arrow 37, the valve member 34 operatively connected with the lever 36 is urged in a direction of arrow 38 to open the port 33. The pressurized fluid is thereby admitted into the controller 32, thence into a central passage in the shaft 20 by way of a port 39, a conduit 40 and a port 41. The pressurized fluid is finally led into a pressure chamber 42, which is provided on the outside of the slidable sheave 9 and has a structure similar to the pressure chamber 30, to urge the slidable sheave 9 in a direction of arrow 43. As will be apparent from the drawing, the force in the direction of arrow 43 is greater than the force in the direction of arrow 31 because the pressure chamber 42 has a pressure receiving area greater than that of the pressure chamber 30. Thus, the sheave 9 is caused to slide in the direction of arrow 43 to thereby urge the slidable sheave 12 to slide in the direction opposite to arrow 31 by the V-belt 11. Therefore, as the slidable sheave 9 is made to slide in the direction of arrow 43, the reduction ratio gradually becomes lower and the shaft 27 rotates at an increased number of revolutions. The controller 32 is axially slidably supported and is provided with an arm 45, the top end of which engages in an annular groove between annular projections 44 projecting radially outwardly from the outer surface of the cylindrical member forming the peripheral wall of the pressure chamber 42. Therefore, any movement of the slidable sheave 9 in either direction causes corresponding movement of the controller 32 in the same direction, and, when the valve member 34 ceases its movement, the slidable sheave 9, hence the controller 32 moves a distance same with the distance travelled by the valve member 34 and stops. Since the movement of the controller 32 relative to the valve member 34 closes the port 33 and a port 46, the pressure within a space 47 defined by the spool valve member 34 and the inner face of the controller 32 is maintained intact and the slidable sheave 9 is held from any movement.

When, on the other hand, the spool valve member 34 is urged in the direction opposite to arrow 38 by the Bowden cable 35, the port 46 is opened to provide communication of the pressure fluid within the pressure chamber 42 with a fluid reservoir 49 by way of the conduit 40, the port 39, the port 46 and a conduit 48. Meanwhile, pressure still exists within the pressure chamber 30 and the slidable sheave 12 is urged in the direction of arrow 31. Therefore, the slidable sheave 9 is urged in the direction opposite to arrow 43 by the belt 11 so that the fluid within the pressure chamber 42 returns to the fluid reservoir 49. This movement of the slidable sheave 9 urges the arm 45 to cause the movement on the controller 32 in the direction opposite to arrow 38. When the valve member 34 ceases its movement, the controller 32 moves until its ports 33 and 46 are closed by the valve member 34 and stops. From the foregoing description, it will be understood that the actuation of the lever 36 by the Bowden cable 35 can suitably control the positions of the slidable sheaves and thus steplessly regulate the speed reduction and multiplying ratio.

Figure 2:
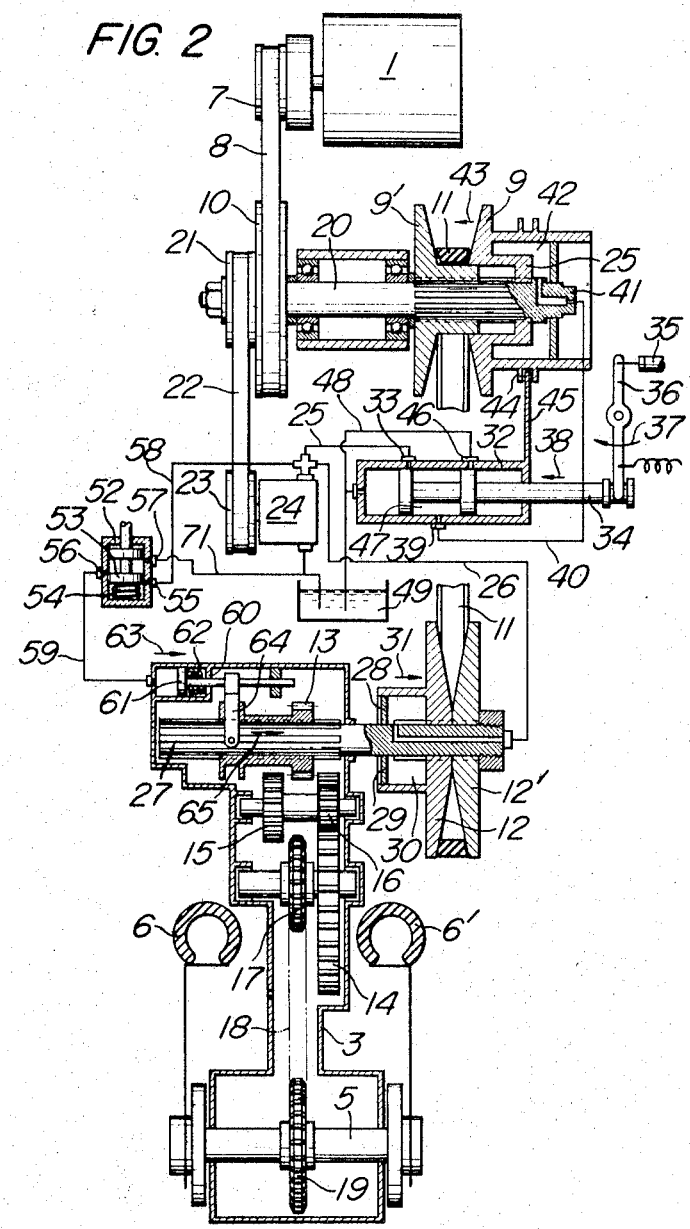
FIG. 2 is a schematic explanatory view showing an arrangement of a power transmission from a motor to driving wheels employed in the cultivator of FIG. 1.
Figure 3:
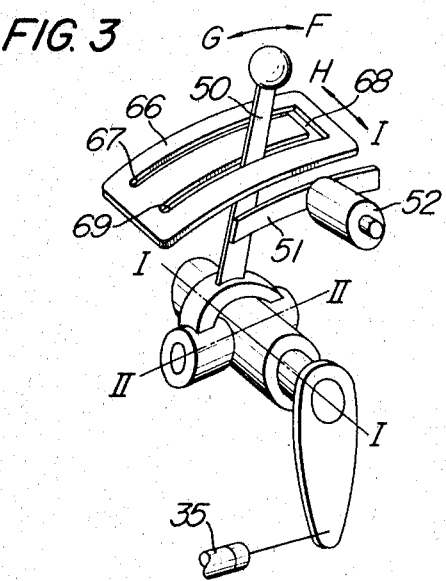
FIG. 3 is a perspective view of actuating means having a single lever for actuating controllers for stepless speed change means and gear means.
Figure 4:
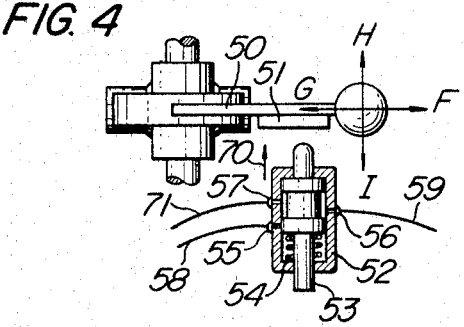
FIG. 4 is a plan view of the actuating means in FIG. 3, with parts in cross section.

FIGS. 3 and 4 are a perspective and a top plan view, respectively, of actuating means employed in the tractor of the present invention. The actuating means includes a lever 50 which is pivotal about axes I—I and II—II so that it can be moved in a longitudinal direction G–F, that is in a direction of arrow D in FIG. 1, about the axis I—I and it can also be moved in a lateral direction H–I about the axis II—II. The aforementioned Bowden cable 35 is connected with the lower end of an arm operatively associated with the lever 50. A plate 51 is fixed to the lever 50 and is disposed opposite a valve member 53 of a controller 52 mounted on the steering handle 4 so that, when the lever 50 is moved in the direction I, the plate 51 can urge the valve member 53 in a direction opposite to arrow 70 in FIG. 4 against the force of a helical spring 54 to thereby allow communication between ports 55 and 56 and to close a port 57. Therefore, pressure fluid from the pump 24 flows through a conduit 58, the ports 55 and 56 of the controller 52 and a conduit 59 into an operating cylinder 60 in FIG. 2 to urge a ram piston 61 in a direction of arrow 63 against the force of a helical spring 62. By the movement of the ram piston 61, a lever 64 firmly fixed to the piston 61 is also urged in a direction of arrow 65 to cause the gear 13 to mesh with the bull gear 14. Thus, it will be seen that the movement of the lever 50 in the direction I in FIG. 3 causes the meshing engagement of the backward gears.

The movement of the lever 50 is limited by longitudinal slots 67 and 69 and a lateral slot 68 provided in a guide plate 66 mounted on the steering handle 4.

When the lever 50 is positioned centrally of the lateral slot 68, the slidable sheave 9 is at the position as shown in FIG. 2 and can not drive the belt 11. In other words, the power transmission system is at the clutch disengaged position. At this clutch disengaged position only, it is possible to move the lever 50 in the lateral direction H–I, that is, to shift the gear 13 in either direction. When the lever 50 is urged in the direction I in the lateral slot 68 and then to the direction G along the longitudinal slot 69, the Bowden cable 35 is actuated while the gears are at the position for backward movement. Then, as the slidable sheave 9 is urged towards the stationary sheave 9' in the manner as described with reference to FIG. 2, the diameter of a circle with which the pulley 9 contacts with the belt 11 becomes gradually greater. This results in the gradual reduction of the reduction ratio and the tractor runs backwardly at a progressively increased speed. The speed of the tractor can gradually be decelerated as the lever 50 is moved in the opposite direction or direction F, and the tractor is finally stopped when the lever 50 is guided in the lateral slot 68 to bring the power transmission system to the clutch disengaged position. When, on the other hand, the lever 50 is moved in the direction H, the valve member 53 is urged in the direction of arrow 70 by the force of the spring 54 to close the port 55 and allow communication between the ports 56 and 57. Therefore, the pressure fluid within the operating cylinder 60 returns to the fluid reservoir 49 by way of the conduit 59, the ports 56 and 57, and a return conduit 71. The ram piston 61 is urged in the direction opposite to arrow 63 by the force of the spring 62 and the gear 13 is disengaged from the bull gear 14 to mesh with the intermediate gear 15 so that the tractor is now ready for forward movement. As the lever 50 is moved in the direction G along the longitudinal slot 67 in FIG. 3, the tractor gains in its speed while running in the forward direction. Thus, it will be understood that the mere sliding movement of the lever 50 along the slots 67, 68 and 69 can make the tractor to run at a forward or backward speed desired by the operator and stop it at any desired time.

What is claimed is:

An agricultural tractor comprising belt-type stepless speed change means provided in the power transmission path from a motor to driving wheels, a hydraulic system operative to change the speed ratio of said stepless speed change means, gear means also provided in the power transmission path from the motor to the driving wheels, a hydraulic system operative to shift the gears in said gear means for effecting normal and reverse rotation of the driving wheels, a controller disposed in each of said hydraulic systems, and actuating means having a single lever for actuating both of said controllers.

References Cited by the Examiner

UNITED STATES PATENTS

| 733,193 | 7/1903 | Hain | 74—218 |
|---|---|---|---|
| 1,633,981 | 6/1927 | Davis | 74—346 |
| 2,878,690 | 3/1959 | Capron et al. | 74—722 X |

FOREIGN PATENTS

| 557,959 | 6/1957 | Canada. |
|---|---|---|
| 1,168,880 | 9/1958 | France. |

MARK NEWMAN, *Primary Examiner.*

W. E. BURNS, *Assistant Examiner.*

Notice of Adverse Decision in Interference

In Interference No. 96,310 involving Patent No. 3,298,239, K. Miyoshi, AGRICULTURAL TRACTORS CONTROLLED BY HYDRAULIC SYSTEMS, final judgment adverse to the patentee was rendered Jan. 29, 1970, as to claim 1.

[*Official Gazette July 7, 1970.*]